United States Patent Office 3,763,200
Patented Oct. 2, 1973

3,763,200
COMPLEXES OF MONOVALENT COPPER AND SILVER SALTS DERIVED FROM FLUOROCARBON SUBSTITUTED SULFONIC ACIDS
Martin B. Dines, Mountainside, N.J., assignor to Esso Research and Engineering Company
No Drawing. Filed Sept. 20, 1971, Ser. No. 182,223
Int. Cl. C07f 1/10
U.S. Cl. 260—430                    8 Claims

ABSTRACT OF THE DISCLOSURE

Complexes of monovalent copper and silver salts derived from fluorocarbon substituted sulfonic acids and characterized by the following formula:

$$[MSO_3R_f]_xL_y$$

wherein $x$ is an integer of 1 or 2, $y$ is an integer ranging from 1 to 4; $R_f$ is a straight or branched fluorocarbon moiety containing from 1 to 10 carbon atoms; M is a monovalent metal selected from the group consisting of copper and silver; L is a ligand selected from the group consisting of $C_2$–$C_{30}$ alkene; $C_2$–$C_{30}$ alkene substituted with halogen; $C_2$–$C_{30}$ alkyne; $C_2$–$C_{30}$ alkyne substituted with halogen; $C_6$–$C_{14}$ arene; $C_6$–$C_{14}$ arene substituted with from 1–6 $C_1$–$C_{12}$ alkyl groups; thiophene, furan, pyridine, or thiophene, furan and pyridine substituted with $C_1$–$C_{12}$ alkyl; $C_6$–$C_{14}$ arene substituted with halogen; $C_1$–$C_{30}$ alkoxy, $C_1$–$C_{30}$ carboxy; carbon monoxide, phosphine and phosphine substituted with $C_1$–$C_{12}$ alkyl or $C_6$–$C_{14}$ aryl and nitriles have been discovered to be excellent agents for separating mixtures of closely boiling compounds.

In one aspect, this invention relates to complexes of monovalent copper and silver salts derived from fluorocarbon substituted sulfonic acids.

In another aspect, this invention relates to methods for synthesizing complexes of monovalent silver and copper salts of fluorocarbon substituted sulfonic acids.

In yet another aspect, this invention relates to processes for the separation of mixtures of unsaturated hydrocarbons such as the separation and recovery of diolefins from monoolefins and paraffins, of monoolefins from paraffins, of aromatics from paraffins, and for the separation of mixtures of isomeric unsaturated hydrocarbons.

It has long been known that various unsaturated materials will combine with certain metal salts of copper and silver. However, with silver and copper, the problem is frequently one of attaining chemical stability without interfering too seriously with the complexing stability of the respective metal ions. Silver ion tends to be reduced to metallic silver whereas the cuprous ion tends to be oxidized to the cupric state or to be disproportionated to the cupric ion and to metallic copper. Furthermore, many of the salts which do complex unsaturates lack the necessary selectivity required in a viable separation process. Still another vexing problem is the proper trade-off between the stability of the complex and the lability necessary to eventually decomplex, or remove the contained substrate.

It has now been found that the unfavorable properties of cuprous or silver salt complexes can be circumvented by forming a cuprous or silver complex from a fluorocarbon substituted sulfonic acid. Such complexes are useful in those separation processes which involve separation of one component of an unsaturated material from a mixture since the various unsaturates form complexes having varying stability.

The silver salt of trifluoromethane sulfonic acid is described in U.S. Pat. 2,732,398. However, it has not been reported that this salt would form complexes with unsaturates under appropriate conditions and that these complexes are valuable selective separation agents under certain conditions.

This invention relates to compositions of matter represented by the following structure:

$$[MSO_3R_f]_xL_y$$

wherein $x$ is an integer of 1 or 2, $y$ is an integer ranging from 1 to 4; $R_f$ is a straight or branched fluorocarbon moiety containing from 1 to 10 carbon atoms; M is a monovalent metal selected from the group consisting of copper and silver; L is a ligand selected from the group consisting of $C_2$–$C_{30}$ alkene; $C_2$–$C_{30}$ alkene substituted with halogen; $C_2$–$C_{30}$ alkyne; $C_2$–$C_{30}$ alkyne substituted with halogen; $C_6$–$C_{14}$ arene; $C_6$–$C_{14}$ arene substituted with from 1–6 $C_1$–$C_{12}$ alkyl groups; thiophene, furan, pyridine, or thiophene, furan and pyridine substituted with $C_1$–$C_{12}$ alkyl; $C_6$–$C_{14}$ arene substituted with halogen, $C_1$–$C_{30}$ alkoxy, $C_1$–$C_{30}$ carboxy; carbon monoxide, phosphine and phosphine substituted with $C_1$–$C_{12}$ alkyl or $C_6$–$C_{14}$ aryl, and nitriles.

These compounds are then employed for separation mixtures of closely boiling hydrocarbons consisting essentially of at least two hydrocarbons, one or both of which is unsaturated by selectively complexing a more strongly complexing unsaturated hydrocarbon with the aforesaid composition of matter under such conditions that the ligand L is replaced with the more strongly complexing unsaturated hydrocarbon thereby removing the non-complexed hydrocarbon in one phase from the resulting complexed hydrocarbon which is present in a second phase.

The compounds of this invention can be prepared by reacting either silver (I) or cuprous oxide with the corresponding acid anhydride of the fluorocarbon sulfonic acid in the presence of the ligand to be complexed according to the following schematic equation:

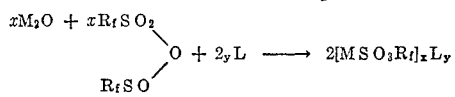

This method is particularly suited for the aromatic and olfinic complexes and can be carried out in the liquid ligand directly. Benzene, toluene, xylenes and the alkyl benzenes all behave well in this reaction.

The processing conditions are such that the temperature ranges from ambient to 500° C., preferably from 50° C. to 250° C. The pressure ranges from 0.1 atmosphere to 500 atmospheres, preferably from 1 to 10 atmospheres, and the mole ratio of the reactants range from 1:1 to 1:10 (cuprous or Ag(I) oxide to anhydride) with the ligand present in excess amount (2:1 to 1000:1 ligand to copper or silver oxide).

Another method for preparing these compounds is accomplished by reducing the copper or silver (II) salt of the sulfonic acid in the presence of the ligand. The copper (II) salts are prepared by contacting copper (II) salts such as the carbonate, oxide, sulfide, hydroxide, nitrate, sulfate with the sulfonic acid. This method is useful for aromatic complexes, olefinic complexes and phosphine complexes. The reducing agent can be copper or silver metal, sulfur dioxide, hydrazine or other such reducing agents. The method of preference uses copper metal and silver metal as a powder.

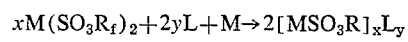

wherein M is silver or copper.

The conditions for this method are such that the temperature ranges from ambient to 500° C., preferably from 50° C. to 250° C., the pressure ranges from 0.1 atmospheres to 500 atmospheres, preferably from 1 to 10 atmospheres and the mole ratio of the reactants ranges from 1:1 to 1:10 (Ag or Cu (II) salt to silver or copper metal) and the ligand is again present in excessive amount (2:1 to 1000:1).

Alternatively, the complexes may be prepared by previously making the base silver (I) or copper (I) salt as set out in copending application bearing Serial No. 182,222 filed Sept. 20, 1971, and now abandoned and contacting it with the ligand under the same range of conditions as set forth in Methods 1 and 2.

$$xMSO_3R + yL \rightarrow [MSO_3R]_xL_y$$

A final means of preparing the complex is via substitution of one ligand for another:

$$[MSO_3R]_xL_y + zL' \rightarrow [MSO_3R]_xL'_z + yL$$

This method can be accomplished in solution, or where the complex is present in the hydrocarbon as a slurry form under a variety of conditions such as those indicated in the previous methods, or directly by adding first complex to excess ligand.

Representative of compounds defined by the above-identified formula are the following:

Aromatics:

[CuSO$_3$CF$_3$]$_2$C$_6$H$_6$
[CuSO$_3$CF$_3$]$_2$C$_8$H$_{10}$
[CuSO$_3$C$_2$F$_5$]$_2$C$_6$H$_6$
[CuSO$_3$C$_2$F$_5$]$_2$C$_8$H$_{10}$
[AgSO$_3$CF$_3$]$_2$C$_6$H$_6$
[AgSO$_3$CF$_3$]$_2$C$_8$H$_{10}$
[CuSO$_3$C$_4$F$_9$]$_2$C$_6$H$_6$
[AgSO$_3$C$_7$F$_{15}$]$_2$C$_6$H$_6$
[CuSO$_3$C$_4$F$_9$]$_2$C$_4$H$_4$S
[AgSO$_3$C$_3$F$_7$]$_2$C$_4$H$_4$O
[CuSO$_3$C$_3$F$_7$]$_2$C$_{10}$H$_{14}$
[CuSO$_3$C$_5$F$_{11}$]$_2$C$_{10}$H$_8$
[AgSO$_3$C$_6$F$_{13}$]$_2$C$_7$H$_8$
[CuSO$_3$C$_2$F$_5$]$_1$C$_6$H$_5$I
[AgSO$_3$C$_2$F$_5$]$_2$C$_7$H$_8$O
[CuSO$_3$C$_4$F$_9$]$_2$C$_{12}$H$_{10}$
[CuSO$_3$C$_{10}$F$_{21}$]$_2$C$_8$H$_{10}$
[AgSO$_3$C$_9$F$_{19}$]$_2$C$_7$H$_8$

Olefins:

[CuSO$_3$CF$_3$]$_1$[C$_2$H$_4$]
[AgSO$_3$CF$_3$]$_1$[C$_4$H$_8$]
[CuSO$_3$C$_7$F$_{15}$]$_1$[C$_5$F$_{10}$]
[CuSO$_3$C$_2$F$_5$[$_1$][C$_4$H$_8$]
[CuSO$_3$CF$_3$][C$_4$H$_6$]$_2$
[AgSO$_3$C$_2$F$_5$][C$_6$H$_{10}$]
[CuSO$_3$C$_3$F$_7$][C$_2$H$_3$Br]
[AgSO$_3$C$_4$F$_9$][C$_2$H$_2$]
[CuSO$_3$C$_3$F$_7$][C$_{12}$H$_{24}$]
[CuSO$_3$C$_2$F$_5$][C$_4$H$_8$]$_3$
[AgSO$_3$C$_8$F$_{17}$][C$_4$H$_6$]

Phosphines, arsines:

[CuSO$_3$C$_2$F$_5$][P(C$_6$H$_6$)$_3$]$_n$ $n$=1,2,3,4
[CuSO$_3$CF$_3$][P(OC$_6$H$_6$)$_3$]$_n$ $n$=1,2,3,4
[AgSO$_3$CF$_3$][AS(C$_6$H$_6$)$_3$]$_n$ $n$=1,2,3,4
[CuSO$_3$C$_2$F$_5$][OP(C$_6$H$_6$)$_3$]$_n$ $n$=1,2,3,4
[CuSO$_3$CF$_3$][P(C$_4$H$_9$)$_3$]$_n$ $n$=1,2,3,4
[CuSO$_3$C$_4$H$_9$][P(OC$_2$H$_5$)$_3$]$_n$ $n$=1,2,3,4

CO compounds:

[AgSO$_3$C$_2$F$_5$][CO]
[CuSO$_3$C$_3$F$_7$][CO]

N compounds and other heterocycles:

[CuSO$_3$C$_3$F$_7$][C$_5$H$_5$N]$_4$
[AgSO$_3$CF$_3$][CH$_3$CN]$_4$
[CuSO$_3$C$_2$F$_5$][C$_4$H$_4$N]$_4$
[CuSO$_3$C$_2$F$_5$][C$_6$H$_5$CN]$_4$

These complexes are useful for electroless deposition of copper from its complexes in appropriate solvents.

The last method presented as a means of synthesis of the complexes namely, the ligand substitution method, is also the basis of a means of utilizing the complexes as separation catalysts.

The complexes undergo ligand exchange equilibria under heterogeneous (slurry) or homogeneous (solution) conditions with aromatic molecules or with other compounds such as olefins, acetylenes, organic functionalities containing oxygen, nitrogen, sulfur, phosphorus and the like, as well as, with small inorganic molecules such as carbon monoxide. These equilibria usually involve a substitution of the initially complexed molecule for the new substrate introduced and form the basis for the separating abilities of these complexes.

Among the alkyl aromatics the complexes are selective in complexing para-xylene from any others and in turn, in the absence of para-xylene, separate para-diisopropyl-benzene from any others. In fact, an entire order of stabilities of the alkyl aromatics has been established which dictates the order of preference of complexion and can be used for any initial mixture of aromatics.

Likewise, olefins can be separated from one another and from saturated hydrocarbons. This of course, applies as well as from aromatic hydrocarbons. Since saturated hydrocarbons are not complexed by the compounds of the subject invention, all of the aforementioned compounds which are, can thusly be separated from them. Certain small molecules can be separated from those inert to the complexes and from each other depending on the order of stabilities of the complex formed. For instance, CO can be selectively absorbed from a stream including $CO_2$ and saturated hydrocarbons. Various heterocyclic compounds can be separated from carbocyclic aromatics even when in trace concentrations.

The aforementioned separations can be carried out under a variety of conditions, dictated principally by the nature of the species to be separated. The complex initially present for the separation may be in a slurry under one or two immiscible liquids, it may be present in a solution, or it may be used as a fixed bed, employing dry or wet contact with the mixture to be separated.

Solvents found to be useful in slurries and as eluents in wet fixed bed type reactions are saturated and other hydrocarbons passive to the complex, nitro-functionalized hydrocarbons, such as nitromethane and nitrobenzene, fluorocarbons, carbon disulfide, dihalobenzenes, and in general, any liquid found to be inert to the complex, and in which the complex does not dissolve to any appreciable extent. The mixture to be separated may or may not be soluble in this diluent liquid.

Solvents found to be appropriate for those separations utilizing the complex in a homogeneous solution are sulfolane, dimethylsulfoxide and liquid sulfones (in general, those solvents containing oxidized sulfur functionalities), nitrogen and oxidized nitrogen type solvents, such as pyrrolidones, dimethyl formamide, acetonitrile and acrylonitrile; in some cases, aromatics can be used as solvents if the complex is soluble, olefins can also be used, so long as the complex to be used in the separation is stronger than the solvation complex (e.g. CuSO$_3$CF$_3$ can be dissolved in dodecene-1 and used to separate ethylene from nitrogen, ethane or other inert gases, or less stable complexes).

The processes described can be carried out at conditions varying from —50° C. to +300° C., 0.01 atmospheres to 1000 atmospheres, and the concentration ranges, depending upon factors such as the flow point of the slurry or the solubility of the complex in the solvent, can be from 1:0.5 complex-to-medium to 1:1000 complex-to-medium.

The essential aspect of all the separations, of course, is the condition that the complexed constituent of the initial mixture be present in a phase other than the non-complexed raffinate after complexation.

The simplest systems involve a solid slurry in a liquid, or a dry solid fixed bed through which the feed passes as a vapor. Following, however, is a description of a two liquid-solid system.

Slurry reactions in fluorocarbon solvents, such as $C_6F_{14}$ and $C_{10}F_{22}$ were found to be useful. These solvents are heavier than hydrocarbon liquids, and nearly totally immiscible with them. The complexes of $CuSO_3CF_3$, moreover, are heavier than the fluorocarbon liquids. The density of the solid complexes are from 2.3–2.6 g./cm.³, for the fluorocarbons the value is around 1.7 g./cm.³ and hydrocarbons (saturated or unsaturated) have densities from 0.6–1.0 g./cm.³. Thus, a slurry extraction technique involving three phases—complex, fluorocarbon and hydrocarbon—could be utilized to effect separations.

One additional factor in these systems in the fact that when under a fluorocarbon, and subjected to hydrocarbons, the solid complex is apparently "wetted" by the hydrocarbons (probably by adsorption of hydrocarbon on the surface of the crystals) and their nature changes so that they become granular in appearance, eventually forming spheroids of various size, depending upon the amount of hydrocarbon present. Hoppe ("Advances in Petroleum Chemistry and Refining," vol. VIII) has described a similar case involving aqueous urea processes, and he points out the advantages of such granular slurries in their ease of filtration and handling. In the present invention, it was shown that the fluorocarbon/hydrocarbon system could separate a blend of $C_8$ aromatics, with the p-xylene complexing in the solid, and the other isomers principally remaining in the upper hydrocarbon phase.

The weight ratio of the complex to the lower fluorocarbon liquid may be in the range of 1:0.5 to 1:100; the ratio of the lower liquid to the upper (hydrocarbon phase) varying from 1:0.1 to 1:100. Temperatures range from 0° C. to 300° C., but are preferably in the near-ambient area. Pressures may be from 0.01 atmospheres to 100 atmospheres, preferably 1 atmosphere.

The following examples demonstrate the various aspects of this invention. Examples 1–5 demonstrate some of the methods of preparation of aromatic complexes. In all cases, a blanket of nitrogen was used, since moisture and oxygen are inimical to these substances.

EXAMPLE 1

Preparation of $(CuSO_3CF_3)_2C_6H_6$ from cuprous oxide

Into 250 ml. benzene, 127 g. (0.45 m.) trifluoromethanesulfonic acid anhydride and 48.2 g. (0.338 m.) cuprous oxide were added. The mixture was brought to reflux for one day, then cooled and filtered, in a dry box. White microcrystals (155 g.; 0.31 m.) were recovered. The material darkens in a sealed capillary tube at about 125°.

*Analysis.*—Calculated for $Cu_2S_2O_6C_8H_6F_6$ (percent): Cu, 25.10; C, 19.10; H, 1.20; S, 12.75. Found (percent): Cu, 24.50; C, 18.83; H, 1.19; S, 12.96.

EXAMPLE 2

Preparation of $(CuSO_3CF_3)_2C_8H_{10}$ from $Cu(SO_3CF_3)_2$

Copper (II) trifluoromethanesulfonate was prepared from basic cupric carbonate and the acid in a way familiar to those versed in the art. This salt (3.0 g.) and 1.0 g. copper powder were added to 40 ml. p-xylene and the mixture refluxed 36 hrs., then filtered hot. Crystals separated from the filtrate which weighed 0.80 g. Analysis and comparison with the complex formed from slurrying the benzene complex (Example 1) in excess p-xylene showed this product to be the p-xylene complex.

*Analysis.*—Calculated for $Cu_2S_2O_6C_{10}H_{10}F_6$ (percent): Cu, 23.9; C, 22.6; H, 1.88. Found (percent): Cu, 23.5; C, 21.99; H, 2.07.

EXAMPLE 3

Preparation of $(CuSO_3CF_3)_2C_{10}H_{12}$ from $Cu(SO_3CF_3)_2$ and $Cu°$ in Tetralin To 52 ml. Tetralin $(C_{10}H_{12})$ was added 5.0 g.

$$Cu(SO_3CF_3)_2$$

and 1.5 g. powdered copper metal. After refluxing overnight at 178° C., the hot mixture was filtered in a dry box. From the filtrate, 5.9 g. white solid was crystallized by cooling.

*Analysis.*—Calculated for $Cu_2S_2O_6F_6C_{12}H_{12}$ (percent): Cu, 22.85. Found (percent): Cu, 23.0.

EXAMPLE 4

Preparation of $(AgSO_3CF_3)_2C_8H_{10}$ from $AgSO_3CF_3$

To 25 ml. p-xylene, 10.0 g. $AgSO_3CF_3$ was added and the reaction heated to 100° for 1 hour and filtered. The isolated white solid (8.1 g.) was shown to be $$(AgSO_3CF_3)_2C_8H_{10}$$

by elemental analysis.

*Analysis.*—Calculated for $Ag_2C_{10}H_{10}S_2O_6F_6$ (percent): Ag, 34.7; C, 19.4; H, 1.6. Found (percent): Ag. 34.5; C, 20.87; H, 1.72.

EXAMPLE 5

Preparation of aromatic complexes by ligand substitution of $(CuSO_3CF_3)_2C_6H_6$ Starting with the benzene complex, other aromatic complexes of $CuSO_3CF_3$ were prepared simply by slurrying in excessive quantities (2-fold to 1000-fold) of the aromatic to be complexed, then filtered. The following complexes were characterized using this procedure.

| Complex | Percent Cu | |
|---|---|---|
| | Calc. | Found |
| [CuSO₃CF₃]₂C₄H₄O (furan) | 25.7 | 25.0 |
| [CuSO₃CF₃][C₅H₅N]₄ (pyridine) | 12.02 | 12.08 |
| [CuSO₃CF₃][C₄H₄S] (thiophene) | 21.4 | 23.0 |
| [CuSO₃CF₃]₂C₁₂H₁₀ (biphenyl) | 21.9 | 21.4 |
| [CuSO₃CF₃]₂C₇H₈O (anisole) | 23.8 | 23.9 |
| [CuSO₃CF₃]₂C₆H₅Br | 21.9 | 22.9 |
| [CuSO₃CF₃][C₆H₅I] | 15.3 | 15.3 |
| [CuSO₃CF₃]₂[C₆H₅Cl] | 23.7 | 24.4 |
| [CuSO₃CF₃]₂[C₈H₁₀] (m-xylene) | 23.8 | 23.3 |
| [CuSO₃CF₃]₂[C₁₀H₈] (naphthalene) | 22.9 | 22.2 |
| [CuSO₃CF₃]₂[C₁₀H₁₄] (p-diethylbenzene) | 22.7 | 22.5 |
| [CuSO₃CF₃]₂[C₇H₈] (toluene) | 24.5 | 24.2 |
| [CuSO₃CF₃]₂[C₁₀H₁₄] (durene) | 22.7 | 22.6 |
| [CuSO₃CF₃]₂[C₁₂H₁₈] (p-diisopropylbenzene) | | |

EXAMPLE 6

Preparation of the toluene complex of copper (I) perfluoroethylsulfonate

A solution is made up composed of 50 g. of the anhydride of perfluoroethylsulfonic acid $(C_4F_{10}S_2O_5$, M.W. 382) in 100 ml. dry toluene. To this is slowly added 15 g. cuprous oxide with efficient stirring. When all the solid is added, the reaction is slowly brought to reflux and maintained there one day, after which the reaction is cooled, filtered, and the solid washed well with pentane, leaving the dry complex.

EXAMPLE 7

Preparation of the p-xylene complex of silver (I) perfluoro-iso-propylsulfonate

Silver (I) oxide (12 g.) is added in small quantities to a solution of 50 g. of the anhydride of perfluoro-isopropyl sulfonic acid with 100 ml. p-xylene and the reaction heated for a day at reflux. It is then cooled to room temperature and filtered, the solid complex is washed with perfluorohexane and pentane and dried.

EXAMPLE 8

Order of stabilities of aromatic complexes of $CuSO_3CF_3$

By slurrying the benzene complex

(2.5 g.) in 15 ml. pentane and addition of 0.3 g. of various aromatics, with subsequent g.c. analysis, an order of stabilities of the complexes was established.

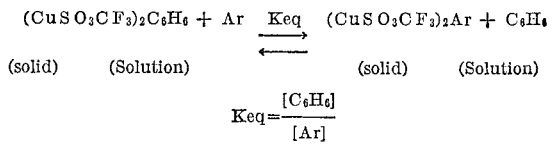

$$Keq = \frac{[C_6H_6]}{[Ar]}$$

The following table relates the Keq to the aromatic used (Ar) with the Keq for benzene equalling 1.

| Ar: | Keq |
|---|---|
| Benzene | 1 |
| Toluene | 0.9 |
| Ethylbenzene | 0.15 |
| o-Xylene | 1.35 |
| m-Xylene | 0.33 |
| p-Xylene | 19.0 |
| Mesitylene | 0.16 |
| Durene | 5.5 |
| Cumene | 0.15 |
| Tetralin | 1.24 |
| n-Butylbenzene | 0.30 |
| t-Butylbenzene | 0.10 |
| sec.-Butylbenzene | 0.15 |
| Pentamethylbenzene | 0.31 |
| o-Diethylbenzene | 1.38 |
| m-Diethylbenzene | 0.50 |
| p-Diethylbenzene | 1.54 |
| p-Diisopropylbenzene | 12.0 |
| m-Diisopropylbenzene | 0.4 |

The preceding list can be the basis of various separations, since the Keq reflects the relative amounts of the complexes which will be present in slurries exposed to the aromatics. It was also found that olefins and carbon monoxide formed far stronger complexes, easily displacing even p-xylene from the complex.

EXAMPLE 9

Separations of $C_8$ aromatics using the trifluoromethanesulfonate salts of copper(I) and silver(I)

In the following examples, some of the conditions under which selective complexation of p-xylene from a blend composed of 20% ethylbenzene, o- and p-xylene and 40% m-xylene are specified. Although the assay of $C_8$ aromatics on the complex was usually determined by destruction of the complex (using aqueous potassium cyanide or nitric acid) it could be shown that the complexed aromatics could also be freed by (a) exhaustive pumping at temperatures of 80°–150° C. and pressures of 0.01–0.1 mm.; (b) treatment of the solid with a liquid of gaseous olefin or other strongly complexed moiety such as carbon monoxide; (c) distillation from a slurry of the solid in a high boiling aromatic or saturated hydrocarbon. The last three means are not destructive to the salt.

EXAMPLE 10

Separation of $C_8$ aromatic isomers using $(CuSO_3CF_3)_2$

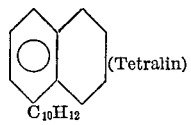
(Tetralin)
$C_{10}H_{12}$

At 80° C. a slurry of 1 g. $(CuSO_3CF_3)_2C_{10}H_{12}$ in 10 ml. Decalin $(C_{10}H_{18})$ was treated with 1 ml. 20/20/40/20 $C_8$ blend. After 100 min., g.c. analysis of the supernatant showed the following composition:

| | Percent |
|---|---|
| Ethylbenzene | 24.0 |
| o-Xylene | 21.2 |
| m-Xylene | 48.1 |
| p-Xylene | 6.6 |
| Tetralin | 31.7 |

The composition of complexed aromatics was:

| | Percent |
|---|---|
| p-Xylene | 90 |
| m-Xylene | 10 |
| Tetralin | Trace |

Similar results were obtained in the absence of Decalin, the slurry medium, when the reaction was run at 25° C. and 40° C.

EXAMPLE 11

Separation of p-xylene from a p-xylene-rich blend of $C_8$ aromatics

To a slurry of 2.5 g. $(CuSO_3CF_3)_2C_6H_6$ in 15 ml. pentane was added 2 g. of $C_8$ aromatics of composition:

| | Percent |
|---|---|
| Ethylbenzene | 1 |
| o-Xylene | 2 |
| m-Xylene | 2 |
| p-Xylene | 95 |

After stirring, the composition of the uncomplexed aromatics was:

| | Percent |
|---|---|
| Ethylbenzene | ~1.5 |
| o-Xylene | 2.3 |
| m-Xylene | 2.3 |
| p-Xylene | 77 |
| Benzene | 18 |

The composition of complexed aromatic, assayed by destruction of the complex with nitric acid or aqueous KCN was >99.8% p-xylene.

EXAMPLE 12

Separation of p-xylene from neat blends of $C_8$ aromatics by $(CuSO_3CF_3)_2C_6H_6$ In a filter funnel, 1.0 g. $(CuSO_3CF_3)_2C_6H_6$ was subjected to 2.0 g. xylene (20% ethylbenzene, o- and p-xylene, 40% m-xylene). After 1 minute the liquid was filtered through the funnel. The composition of the liquid was:

| | Percent |
|---|---|
| Ethylbenzene ca. | 23 |
| p-Xylene | 10 |
| m-Xylene | 43 |
| o-Xylene | 23 |

The composition of $C_8$ aromatics on the complex was:

| | Percent |
|---|---|
| Ethylbenzene | 0.3 |
| p-Xylene | 93.2 |
| m-Xylene | 5.9 |
| o-Xylene | 0.6 |

EXAMPLE 13

Separation of $C_8$ aromatic isomers using $CuSO_3CF_3$

To 5 ml. $C_8$ aromatic blend (20% ethylbenzene, o- and p-xylene, 40% m-xylene) maintained at 135–140° C., 3.0 g. $CuSO_3CF_3$ was added and the reaction cooled after 10 min., and 15 ml. hexane added to simplify the filtration. From the filtrate, ca. 2 g. of oil was isolated having the composition:

| | Percent |
|---|---|
| Ethylbenzene | 25 |
| p-Xylene | 4 |
| m-Xylene | 49.5 |
| o-Xylene | 21.5 |

Decomposition of the solid complex resulted in the isolation of 0.5 g. oil having the composition:

| | Percent |
|---|---|
| p-Xylene | 96.8 |
| m-Xylene | 3.2 |

EXAMPLE 14

Separation of $C_8$ aromatic isomers on a fixed bed of $AgSO_3CF_3$

In a 10" glass tube (inside diameter ⅜") fitted with a stopcork was added 2.0 g. $AgSO_3CF_3$ as a pentane slurry. Then, 2 ml. of a blend of $C_8$ isomers (20% ethylbenzene, 40% m-xylene) was eluted through the column with pentane. A fraction (10 ml.) was collected and g.c. analysis showed the composition of the $C_8$ isomers to be:

| | Percent |
|---|---|
| Ethylbenzene | 24.1 |
| p-Xylene | 5.2 |
| m-Xylene | 47.6 |
| o-Xylene | 23.1 |

Ethylene was then allowed to sweep through the column to desorb the complexed aromatics which were trapped with Dry Ice. Their composition was:

| | Percent |
|---|---|
| Ethylbenzene | <1 |
| p-Xylene | 92.6 |
| m-Xylene | 4.6 |
| o-Xylene | 2.8 |

If the same process is carried out with the benzene complex —$(AgSO_3CF_3)_2C_6H_6$— the same results are obtained, with the decomplexed benzene also being observed in the eluent.

It has also been found that the selective complexation of p-xylene from a blend occurs in a dry phase of copper complex. The initial blend was the same as above (20/20/40/20). The condensate of vapors passing through the column was composed of 25% benzene, 30% ethylbenzene, no p-xylene (<0.5%), 39% m-xylene and 6% o-xylene. Complexed on the column, the composition of the aromatics was 14.6% benzene, no ethylbenzene (<.5%), 65.4% p-xylene, 6.9% m-xylene, and 13.4% o-xylene.

EXAMPLE 15

Use of a two phase (fluorocarbon:hydrocarbon) liquid system with the solid complex in an extractive separation of p-xylene from a blend of $C_8$ aromatics Preparation of the slurry—into five 15 ml. vials fitted with rubber septum stoppers was added 3 g. of the benzene copper (I) trifluoromethane sulfonate complex and 10 ml. perfluoro-hexane ("FC–86"), forming a slurry. Then, into each vial was added the following quantities of the 20/20/40/20 blend of the $C_8$ aromatics: 1, 0.5 ml.; 2, 1.0 ml.; 3, 1.5 ml.; 4, 2.0 ml.; 5, 2.5 ml. In vial 1, the slurry appeared as a fine powder under the fluorocarbon; in 2, the particles were somewhat larger, yet still heavier than the fluorocarbon phase; in 3, the particles of the slurry were more fluocculent, and dispersed throughout the liquid rather than settled under it; in 4, the particle had formed granular spheroids, which floated in the liquid; in 5, they were spongy and floated.

The spheroids described in the fourth vial could be broken up by shaking, but reformed upon rolling of the vial. By adding 10 ml. cyclohexane to make possible the detection of uncomplexed aromatics, it was shown by g.c. that no p-xylene remained uncomplexed, however, the other aromatics were present in their correct ratios.

EXAMPLE 16

Olefin complexes of $CuSO_3CF_3$

The following complexes of $CuSO_3CF_3$ were prepared by heating either the benzene complex or the salt in excessive quantities (two-fold to one hundred-fold) of the olefin. The high stability of the olefin complexes is demonstrated by their melting points (in a sealed capilliary tube).

| Complex: | M.P., degrees |
|---|---|
| (Cyclohexene)$CuSO_3CF_3$ | dec. >130 |
| (Heptene-1)$CuSO_3CF_3$ | 66–71 |
| (Tetramethylethylene)$CuSO_3CF_3$ | 110–112 |
| (t-Butylethylene)$CuSO_3CF_3$ | 75–79 |
| (Styrene)$CuSO_3CF_3$ | dec. >175 |
| (Vinyl bromide)$CuSO_3CF_3$ | 175–80 |
| (Ethylene)$CuSO_3CF_3$ | dec. ~150 |
| (1,3-butadiene)$CuSO_3CF_3$ | dec. >210 |
| (Pentene-1)$CuSO_3CF_3$ | 62–64 |
| (Dodecene-1)$CuSO_3CF_3$ | 69–70 |
| ($\Delta^{1,9}$-octalin)$CuSO_3CF_3$ | 120–130 |
| (Sulfolene)$CuSO_3CF_3$ | dec. >150 |

EXAMPLE 17

Uptake of gases by $(CuSO_3CF_3)_2C_6H_6$

Solutions of the complex were connected to a gas burette at atmospheric pressure and the uptake measured. Uptakes are corrected for 1 millimole (0.5 g.) of complex in 10–15 ml. of solvent. (Uptake by the solvent has been corrected for as well.)

| Solvent | Gas | Uptake (ml.) |
|---|---|---|
| DMSO | Ethylene | 21 |
| DMSO | 1,3-butadiene | 85 |
| DMSO | trans-2-butene | 28 |
| DMSO | cis-2-butene | 26 |
| Octane (slurry) | 1,3-butadiene | 48 |
| Sulfolane | Ethylene | 48 |
| Do | Propylene | 28 |
| Do | 1-butene | 106 |
| Do | cis-2-butene | 216 |
| Do | trans-2-butene | 42 |
| Do | Acetylene | 272 |
| Do | Isobutylene | 116 |
| Do | Carbon monoxide | 44 |

EXAMPLE 18

Separation of gaseous mixtures using $[Cu(SO_3CF_3)]_2C_6H_6$ in sulfolane

In a series of trials, a solution of 0.5 g. benzene complex in 5 ml. sulfolane was subjected to 150 ml. of blends of gaseous unsaturates in a gas burette device at ambient conditions, the results are summarized in the table.

SEPARATIONS OF GAS MIXTURES [1]

| Trial | Gases | Uptake (ml.) | A[2] |
|---|---|---|---|
| 1 | Propylene/ethylene | 36 | 1.53 |
| 2 | 1-butene/2-butene(s) | 39 | 1.35 |
| 3 | cis-butene/trans-butene | 42 | 1.64 |
| 4 | 1,3-butadiene/acetylene | 85 | 1.30 |
| 5 | 1,3-butadiene/ethylene | 55 | 1.76 |
| 6 | 1,3-butadiene/1-butene | 63 | 1.46 |
| 7 | 1-butene/isobutylene | 63 | 1.38 |

[1] Corrected for sulfolane dissolution selectivity.
[2] A is defined as the mole fraction of the first component in the complex over the mole fraction of the first component in the remaining uncomplexed gas.

EXAMPLE 19

Purification of benzene containing a small amount of pyridine

Benzene containing 0.4% pyridine (2 ml.) was treated with 30 mg. $(CuSO_3CF_3)_2C_6H_6$. After 5 minutes, the assay in the supernatant was <0.04% pyridine.

EXAMPLE 20

In an example of electroless deposition (metal deposition without passage of electric current), 3.78 grams of cuprous trifluoromethane sulfonate, complexed with ½ mole of benzene per molecule of salt, were dissolved in tetrahydrofuran to a total volume of 150 cc. and placed in a flat bottomed flask under a nitrogen atmosphere. After several hours, a bright copper mirror formed on the bottom and walls of the flask wetted by the solution. Analysis of the solid copper showed 96.1% purity.

This behavior shows that (1) the solution was acting as its own reducing agent, as electroless deposition ordinarily requires an added reducing agent, and (2) that the reaction is catalyzed by the metallic surface first formed, to avoid bulk precipitation leading to a powdery precipitate. Both these facts are rationalized by the occurrence of two redox half cell reactions occurring simultaneously, with electron transfer occurring through the conductive metal and in transfer occurring in solution:

$$Cu(Cf_3SO_3) + e^\ominus \rightarrow Cu^\circ + CF_3SO_3^-$$

$$Cu(CF_3SO_3) + CF_3SO_3^- \rightarrow Cu(CF_3SO_3)_2 + e^\ominus$$

It is the low basicity of these anions which permits ionization to occur which makes this local cell action possible. Thus the overall reaction is:

$$2Cu(CF_3SO_3) \rightarrow Cu^\circ + Cu(CF_3SO_3)_2$$

But it is the catalysis of this reaction by the surface which generates the mirror.

What is claimed is:

1. A composition of matter characterized by the following formula:

$$[AgSO_3R_f]_xL_y$$

wherein $x$ is an integer of 1 or 2, $y$ is an integer ranging from 1 to 4; $R_f$ is a straight or branched fluoroacarbon moiety containing from 1 to 10 carbon atoms; L is a ligand selected from the group consisting of $C_2$–$C_{30}$ alkene; $C_2$–$C_{30}$ alkene substituted with halogen; $C_2$–$C_{30}$ alkyne; $C_2$–$C_{30}$ alkyne substituted with halogen; $C_6$–$C_{14}$ arene; $C_6$–$C_{14}$ arene substituted with from 1–6 $C_1$–$C_{12}$ alkyl groups.

2. A composition according to claim 1, $$[AgSO_3CF_3]_1C_2H_4$$

3. A composition according to claim 1, $$[AgSO_3CF_3]_2C_6H_6$$

4. A composition according to claim 1, $$[AgSO_3CF_3]_2C_8H_{10}$$

5. A process for preparing complexes of monovalent copper and silver salts characterized by the following formula:

$$[MSO_3R_f]_xL_y$$

wherein $x$ is an integer of 1 or 2, $y$ is an integer ranging from 1 to 4; $R_f$ is a straight or branched fluorocarbon moiety containing from 1 to 10 carbon atoms; M is a monovalent metal selected from the group consisting of copper and silver; L is a ligand selected from the group consisting of $C_2$–$C_{30}$ alkene; $C_2$–$C_{30}$ alkene substituted with halogen; $C_2$–$C_{30}$ alkyne, $C_2$–$C_{30}$ alkyne substituted with halogen; $C_6$–$C_{14}$ arene; $C_6$–$C_{14}$ arene substituted with from 1–6 $C_1$–$C_{12}$ alkyl groups; said process comprising the steps of reacting $M_2O$ with a fluorocarbon sulfonic acid anhydride characterized by the following formula:

under suitable processing conditions in the presence of a ligand, said ligand being one selected from the group consisting of $C_2$–$C_{30}$ alkene, $C_2$–$C_{30}$ alkene substituted with halogen; $C_2$–$C_{30}$ alkyne; $C_2$–$C_{30}$ alkyne substituted with halogen; $C_6$–$C_{14}$ arene; $C_6$–$C_{14}$ arene substituted with from 1–6 $C_1$–$C_{12}$ alkyl groups.

6. A process according to claim 5 wherein the ligand is one selected from the group consisting of benzene, toluene, xylene and alkylbenzenes substituting 1–6 positions of the aromatic nucleus.

7. A process for preparing complexes of monovalent copper and silver salts characterized by the following formula:

$$[MSO_3R_f]_xL_y$$

wherein $x$ is an integer of 1 or 2, $y$ is an integer ranging from 1 to 4; $R_f$ is a straight or branched fluorocarbon moiety containing from 1 to 10 carbon atoms; M is a monovalent metal selected from the group consisting of copper and silver; L is a ligand selected from the group consisting of $C_2$–$C_{30}$ alkene; $C_2$–$C_{30}$ alkene substituted with halogen; $C_2$–$C_{30}$ alkyne, $C_2$–$C_{30}$ alkyne substituted with halogen; $C_6$–$C_{14}$ arene, $C_6$–$C_{14}$ arene substituted with from 1–6 $C_1$–$C_{12}$ alkyl groups; said process comprising the step of reducing a sulfonic acid salt characterized by the following formula:

$$M(SO_3R_f)_2$$

wherein M is a metal selected from the group consisting of copper (II) and silver (II) and $R_f$ is a straight or branched fluorocarbon moiety containing from 1 to 10 carbon atoms, in the presence of a reducing agent and the ligand L under suitable processing conditions.

8. A process according to claim 7 wherein the reducing agent is one selected from the group consisting of copper metal, silver metal, sulfur dioxide or hydrazine.

References Cited
UNITED STATES PATENTS

| | | |
|---|---|---|
| 2,732,398 | 1/1956 | Brice et al. |
| 3,333,007 | 7/1967 | Scanley _____ 260—430 X |
| 2,864,769 | 12/1958 | Lutz et al. _____ 260—430 X |
| 3,649,659 | 3/1972 | Otto et al. _____ 260—438.1 X |
| 3,647,840 | 3/1972 | Bills _____ 260—438.1 |

HELEN M. S. SNEED, Primary Examiner

U.S. Cl. X.R.

117—138.8; 204—52; 260—438.1, 674